(12) United States Patent
Royer, Jr. et al.

(10) Patent No.: US 7,103,724 B2
(45) Date of Patent: Sep. 5, 2006

(54) METHOD AND APPARATUS TO GENERATE CACHE DATA

(75) Inventors: Robert J Royer, Jr., Portland, OR (US); Knut S. Grimsrud, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 10/114,930

(22) Filed: Apr. 1, 2002

(65) Prior Publication Data

US 2003/0188123 A1 Oct. 2, 2003

(51) Int. Cl.
*G06F 12/00* (2006.01)

(52) U.S. Cl. .................. 711/137; 711/113; 711/203; 711/213; 709/216

(58) Field of Classification Search ........ 711/202–203, 711/103, 113, 118, 119, 137, 161, 162; 365/145, 365/216; 709/213, 216
See application file for complete search history.

(56) References Cited

U.S. PATENT DOCUMENTS

| | | | |
|---|---|---|---|
| 5,046,043 A | | 9/1991 | Miller et al. |
| 5,175,842 A | | 12/1992 | Totani |
| 5,444,651 A | | 8/1995 | Yamamoto et al. |
| 5,466,629 A | | 11/1995 | Mihara et al. |
| 5,519,831 A | * | 5/1996 | Holzhammer ............ 714/22 |
| 5,586,291 A | * | 12/1996 | Lasker et al. ............ 711/113 |
| 5,604,881 A | | 2/1997 | Thomas |
| 5,754,888 A | | 5/1998 | Yang et al. |
| 5,778,436 A | * | 7/1998 | Kedem et al. ............ 711/137 |
| 5,806,085 A | | 9/1998 | Berliner |
| 5,860,083 A | * | 1/1999 | Sukegawa ............... 711/103 |
| 6,025,618 A | | 2/2000 | Chen |
| 6,044,439 A | * | 3/2000 | Ballard et al. ............ 711/137 |
| 6,047,363 A | * | 4/2000 | Lewchuk ................. 711/213 |
| 6,055,180 A | | 4/2000 | Gudesen et al. |
| 6,059,835 A | | 5/2000 | Bose |
| 6,064,615 A | * | 5/2000 | Gudesen ................. 365/215 |
| 6,078,999 A | | 6/2000 | Raju et al. |
| 6,157,993 A | * | 12/2000 | Lewchuk ................. 711/213 |
| 6,286,084 B1 | * | 9/2001 | Wexler et al. ........... 711/152 |
| 6,295,577 B1 | * | 9/2001 | Anderson et al. ........ 711/113 |
| 6,370,614 B1 | | 4/2002 | Teoman et al. |
| 6,463,509 B1 | | 10/2002 | Teoman et al. |
| 6,493,806 B1 | | 12/2002 | Royer, Jr. et al. |
| 6,498,744 B1 | * | 12/2002 | Gudesen et al. .......... 365/145 |
| 6,499,088 B1 | * | 12/2002 | Wexler et al. ........... 711/152 |
| 6,539,382 B1 | * | 3/2003 | Byrne et al. ............. 707/10 |
| 6,539,456 B1 | | 3/2003 | Stewart |
| 6,564,286 B1 | | 5/2003 | DaCosta |

(Continued)

FOREIGN PATENT DOCUMENTS

EP 0 702 305 A1 3/1996

(Continued)

OTHER PUBLICATIONS

IBM, Ultrfast Nonvolatile Ferroelectric Information Storage Device, Nov. 1, 1994, IBM Technical Disclosure Bulletin, vol. 37, Issue 11, pp. 421-424.*

(Continued)

*Primary Examiner*—Kevin Verbrugge
(74) *Attorney, Agent, or Firm*—Matthew C. Fagan

(57) ABSTRACT

Briefly, in accordance with an embodiment of the invention, a method to generate cache data is provided, wherein the method includes identifying access data transmitted from a storage device during execution of a predetermined software program and generating cache data using the identified access data.

24 Claims, 3 Drawing Sheets

U.S. PATENT DOCUMENTS

| | | | |
|---|---|---|---|
| 6,647,471 | B1 | 11/2003 | March et al. |
| 6,651,141 | B1* | 11/2003 | Adrangi ..................... 711/118 |
| 6,662,267 | B1* | 12/2003 | Stewart ...................... 711/113 |
| 6,670,659 | B1* | 12/2003 | Gudesen et al. ............ 257/295 |
| 6,725,342 | B1 | 4/2004 | Coulson |
| 6,728,876 | B1 | 4/2004 | Kumar |
| 6,785,767 | B1 | 8/2004 | Coulson |
| 6,839,812 | B1 | 1/2005 | Royer, Jr. et al. |
| 6,845,501 | B1* | 1/2005 | Thompson et al. ......... 717/140 |
| 6,920,533 | B1 | 7/2005 | Coulson et al. |
| 6,941,423 | B1 | 9/2005 | Coulson |
| 2002/0083264 | A1 | 6/2002 | Coulson |
| 2002/0147770 | A1* | 10/2002 | Tang ......................... 709/203 |
| 2002/0160116 | A1* | 10/2002 | Nordal et al. ............... 427/378 |
| 2002/0178331 | A1* | 11/2002 | Beardsley et al. .......... 711/113 |
| 2003/0005219 | A1 | 1/2003 | Royer, Jr. et al. |
| 2003/0005223 | A1 | 1/2003 | Coulson et al. |
| 2003/0023663 | A1* | 1/2003 | Thompson et al. ......... 709/108 |
| 2003/0046493 | A1 | 3/2003 | Coulson |
| 2003/0061436 | A1 | 3/2003 | Royer, Jr. et al. |
| 2003/0074524 | A1 | 4/2003 | Coulson |
| 2003/0084239 | A1* | 5/2003 | Stewart ...................... 711/113 |
| 2003/0084245 | A1* | 5/2003 | Tanaka et al. .............. 711/118 |
| 2003/0120868 | A1 | 6/2003 | Royer, Jr. et al. |
| 2003/0163646 | A1* | 8/2003 | O'Neil ....................... 711/137 |
| 2003/0188251 | A1 | 10/2003 | Brown et al. |
| 2004/0088481 | A1* | 5/2004 | Garney ....................... 711/113 |
| 2004/0162950 | A1 | 8/2004 | Coulson |
| 2004/0225826 | A1 | 11/2004 | Royer, Jr., et al. |
| 2004/0225835 | A1 | 11/2004 | Coulson |
| 2005/0283574 | A1* | 12/2005 | O'Neil ....................... 711/137 |

FOREIGN PATENT DOCUMENTS

| | | |
|---|---|---|
| WO | WO 02/01364 A1 | 1/2002 |
| WO | WO 02/01364 A3 | 1/2002 |
| WO | WO 02/01365 A2 | 1/2002 |
| WO | WO 02/01365 A3 | 1/2002 |
| WO | WO 03/003202 A1 | 1/2003 |
| WO | WO 03/003217 A2 | 1/2003 |
| WO | WO 03/003217 A3 | 1/2003 |
| WO | WO 03/034230 A1 | 4/2003 |

OTHER PUBLICATIONS

IBM Technical Disclosure Bulletin, vol. 37, No. 11, Nov. 1, 1994, pp. 421-424, "Ultrafast Nonvolatile Ferroelectric Information Storag Device".*

U.S. Appl. No., pending, 09/602,011 filed Jun. 23, 2000, to Richard Coulson, "Non-Volatile Cache Integrated with Storage Device".

U.S. Appl. No., pending, 09/669,770 filed Sep. 26, 2000, to Richard Coulson, "Non-Volatile Mass Storage Cache Coherency Administrator".

U.S. Appl No., pending, 09/602,008 filed Jun. 23, 2000, to Richard Coulson, "In-Line Cache".

U.S. Appl. No., pending, 09/602,009 filed Jun. 23, 2000, to Richard Coulson, "Non-Volatile Cache Expansion Board".

Jack Robertson, Silison Strategies, "Hyundai enters Japanese-dominated FeRAM Market", Sep. 3, 1998.

EEdesign, "Ramtron boosts serial FRAM density to 64 Kbits", Oct. 6, 1999.

Ramtron International Corp., data sheet, "The FRAM Technology", Jan. 1994.

Ramtron International Corp., data sheet "Preliminary—FM24C64 64 Kb FRAM Serial Memory", Dec. 7, 1999.

Ramtron International Corp., data sheet "Preliminary—FM1608 64Kb Bytewide FRAM Memory", Dec. 7, 1999.

W. Merz et al., Bell Laboratories Record, "Ferroelectric Storage Devices", Sep. 1955.

O. Auciello et al., Physics Today, "The Physics of Ferroelectric Memories", Jul. 1998.

C. F. Pulvarti, The Catholic University of America, IRE Transaction—Component Parts, "Ferroelectrics and their Memory Applications", 1956.

Date, M., et al., "Opto-Ferroelectric Memories Using Vinylidene Fluorode Copolymers", IEEE, pp. 298-302 (1988).

Hodges, David A., et al., "Analysis and Design of Integrated Circuits", McGraw-Hill, Inc., pp 388-389 (1983).

Lang, Sidney B., et al., "Pyroelectric Applications of Ferroelectric Polymers", IEEE, pp. 251-255 (1988).

moazzami, Reza, et al., "A Ferroeletric DRAM Cell for High-Density NVRAM'", IEEE Electron Device Letters, vol. 11, No. 10, pp. 454-456 (Oct. 1990).

Ramtron, "Replacing a Dallas Semiconductor Ds1225 with Fram Memory", Application Note, Ramtron Interenationsl Corporation, Colorado Springs, Colorado, pp.1-2 (1994)

U.S. Appl. No. 09/602,010 entitled"Non-volatile Cache", by Richard Coulson, filed Jun. 23, 2000.

White, Ron, "How Computers Work", Ziff-Davis Press, pp.71-73 (1993).

* cited by examiner

METHOD AND APPARATUS TO GENERATE CACHE DATA

BACKGROUND

Computing systems may include various types of memory devices having various access times. For example, a computing system may include a nonvolatile hard disk memory and a relatively faster volatile cache memory.

Several methods exist for determining which information to store in the cache memory. A cache memory may store frequently used data so that the operating system or a particular software application may access the frequently used data from the relatively faster cache memory as opposed to accessing the information from the relatively slower hard disk. Storing frequently used data in a relatively faster cache memory may improve system performance.

Determining the appropriate methods for generating cache data for a particular system may be problematic. The appropriate caching method may depend on many factors to improve performance of a particular system.

Thus, there is a continuing need for alternate ways to generate cache data.

BRIEF DESCRIPTION OF THE DRAWINGS

The subject matter regarded as the invention is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

Figure 1:
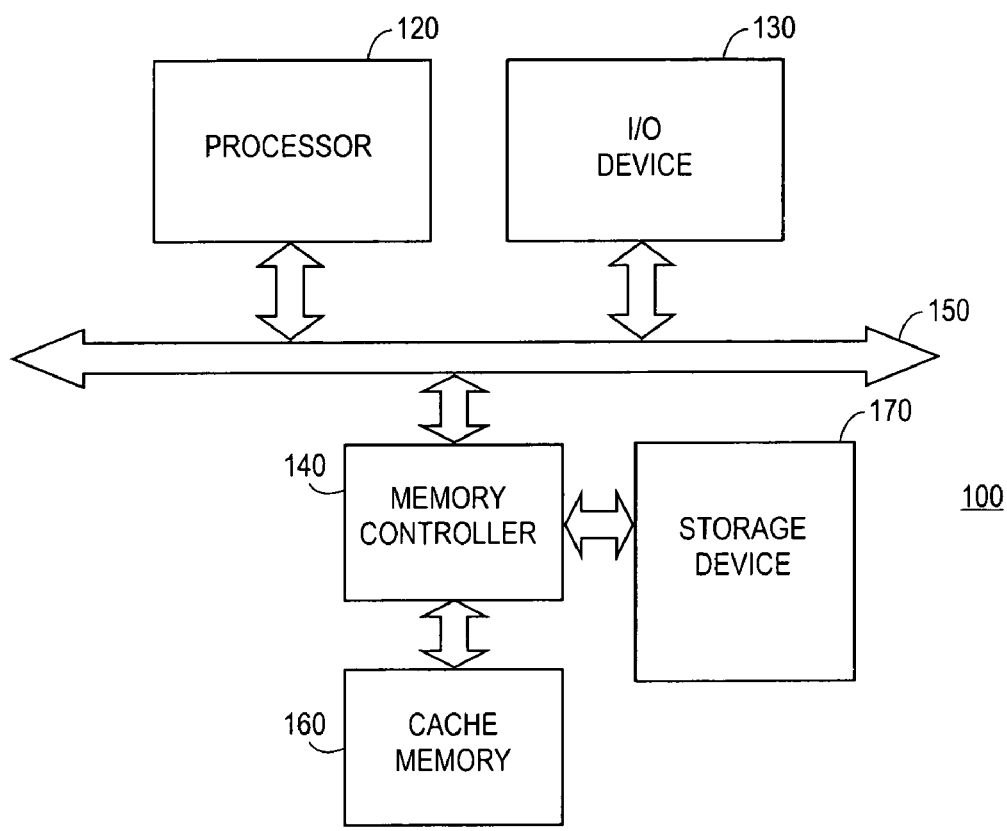
FIG. 1 is a block diagram illustrating a computing system in accordance with an embodiment of the claimed subject matter.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail so as not to obscure the claimed subject matter.

Embodiments of the claimed subject matter may include an apparatus for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions and data.

Embodiments of the claimed subject matter are not described with reference to any particular programming language. It will be appreciated that a variety of programming languages may be used to implement the teachings of the claimed subject matter as described herein. For example, high-level procedural, object-oriented, assembly, or machine programming languages may be used to implement the claimed subject matter.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Turning to FIG. 1, an embodiment of a computing system 100 is illustrated. Computing system 100 may be used in a variety of applications such as, for example, a personal digital assistant (PDA), a two-way pager, a cellular phone, a portable computer, a desktop computer, a workstation, or a server. Although it should be pointed out that the scope and application of the claimed subject matter is in no way limited to these examples.

In this embodiment, computing system 100 may comprise a processor 120, an input/output (I/O) device 130, and a memory controller 140 connected to a bus 150. In addition, computing system 100 may include a cache memory 160 and a storage device 170 connected to memory controller 140.

Although the scope of the claimed subject matter is not limited in this respect, processor 120 may comprise, for example, one or more microprocessors, digital signal processors, microcontrollers, or the like. I/O device 130 may be used for receiving data from a user or may be used for transmitting data to a user. I/O device 130 may comprise, for example, a keyboard, a display, a computer mouse, or a printer, although the scope of the claimed subject matter is not limited in this respect. Bus 150 may be a data path comprising, for example, a collection of data lines to transmit data from one part of computing system 100 to another.

In some embodiments, memory controller 140 together with processor 120 may control cache memory 160 and storage device 170. For example, memory controller 140 may control the transfer of data between cache memory 160 and storage device 170. Memory controller 140 may be integrated ("on-chip") with processor 120. In alternate embodiments, memory controller 140 may be a discrete memory controller, wherein memory controller 140 is external ("off-chip") to processor 120. In other embodiments, portions of the functionality of memory controller 140 may be implemented in processor 120 as, for example, a software application, module, or routine.

In some embodiments, cache memory 160 and storage device 170 may be adapted to store instructions, such as, for example, instructions for an operating system or a software program that may be executed by processor 120. In addition, cache memory 160 and storage device 170 may also store data that is accessed by these instructions.

Cache memory 160 may be integrated with storage device 170 and a reserved portion of a storage device 170 may be used to implement cache memory 160. In alternate embodiments, cache memory 160 may be a discrete memory device, wherein cache memory 160 is external to storage device 170.

Cache memory 160 may be a relatively faster memory device compared to storage device 170, i.e., the access time of cache memory 160 may be less than the access time of storage device 170. For example, cache memory 160 may have an access time of less than one millisecond, e.g., approximately one microsecond. Storage device 170 may have a relatively slower access time, compared to cache memory 160, of at least one millisecond, e.g., approximately 10 milliseconds, although the scope of the claimed subject matter is not limited in this respect. As another example, in alternate embodiments, cache memory 160 may have an access time of less than one microsecond, e.g., approximately 100 nanoseconds. Storage device 170 may have a relatively slower access time, compared to cache memory 160, of at least one microsecond, e.g., approximately 100 microseconds. In yet another example, the access time of cache memory 160 may be at least two times faster than the access time of storage device 170. For example, in some embodiments, cache memory 160 may have an access time of about one microsecond and storage device 170 may have an access time of about two microseconds.

Cache memory 160 may be a relatively smaller memory device compared to storage device 170, i.e., the storage capability of cache memory 160 may be less than the storage capability of storage device 170. For example, cache memory 160 may have a storage capacity of less than 100 megabytes, e.g., approximately 30 megabytes. Storage device 170 may have a relatively larger storage capacity, compared to cache memory 160, of at least 100 megabytes, e.g., approximately one gigabyte, although the scope of the claimed subject matter is not limited in this respect. As another example, in alternate embodiments, cache memory 160 may have a storage capacity of less than one gigabyte, e.g., approximately 500 megabytes. Storage device 170 may have a relatively larger storage capacity, compared to cache memory 160, of at least one gigabyte, e.g., approximately 100 gigabytes or one terabyte, although the scope of the claimed subject matter is not limited in this respect.

In some embodiments, cache memory 160 may be a volatile memory such as, for example, a static random access memory (SRAM) or a dynamic random access memory (DRAM), although the scope of the claimed subject matter is not limited in this respect. In alternate embodiments, cache memory 160 may be a nonvolatile memory such as, for example, an electrically programmable read-only memory (EPROM), an electrically erasable and programmable read only memory (EEPROM), a flash memory (NAND and NOR types, including multiple bits per cell), a ferroelectric random access memory (FRAM), a polymer ferroelectric random access memory (PFRAM), a magnetic random access memory (MRAM), an Ovonics Unified Memory (OUM), a disk memory, or any other device capable of storing software instructions and/or data. Other types of nonvolatile memory are also within the scope of the claimed subject matter, including volatile memory with a battery backup, as the battery may prevent the memory from losing its contents when the main power source is off.

Storage device 170 may be a volatile memory or a nonvolatile disk memory such as, for example, a floppy disk, an electromechanical hard disk, an optical disk, or a magnetic disk. In alternate embodiments, storage device 170 may be an EPROM, an EEPROM, a magnetic or optical card, a flash memory, a FRAM, a PFRAM, a MRAM, an OUM, or any other device capable of storing software instructions and data.

In the embodiment illustrated in FIG. 1, cache memory 160 may operate as a cache or disk cache for storage device 170. As illustrated above, cache memory 160 may be a relatively smaller and faster type of memory device compared to storage device 170. As an example, cache memory 160 may cache frequently accessed data from storage device 170 during operation of computing system 100, although the scope of the claimed subject matter is not limited in this respect. As frequently accessed data is requested from storage device 170, it may be available in cache memory 160, thereby avoiding a relatively longer search and fetch in storage device 170. Therefore, overall system performance may be improved by caching data in cache memory 160.

Many types of data and/or instructions may be loaded into cache memory 160 to increase the performance of computing system 100. One method to populate cache memory 160 may include operating computing system 100 with random or arbitrary instructions for a given period of time, e.g., one day or one week. During this period of time, cache memory 160 may be loaded or populated with frequently accessed or most recently accessed data. Accordingly, the processing efficiency of computing system 100 may be increased since data with a high probability of access by the operating system or a particular software application is located in cache memory 160 rather than in storage device 170.

Processor 120 and/or memory controller 140 may include circuitry, software, or a combination of circuitry and software to populate cache memory 160 with data and/or instructions with a high probability of access by the operating system or a particular software application. As discussed above, cache memory 160 may be a nonvolatile memory, thereby allowing retention of the cache data during a loss of power.

A manufacturer of computing system 100 may populate cache memory 160 during manufacturing and/or initialization of computing system 100 prior to a user session. The manufacturer may populate a cache memory in a demonstration or test system. The manufacturer may then use the information generated on the test system to populate the cache memory of another system. Accordingly, new systems with populated cache memories may be produced, wherein the performance of the new system may be increased prior to a user session.

Figure 2:
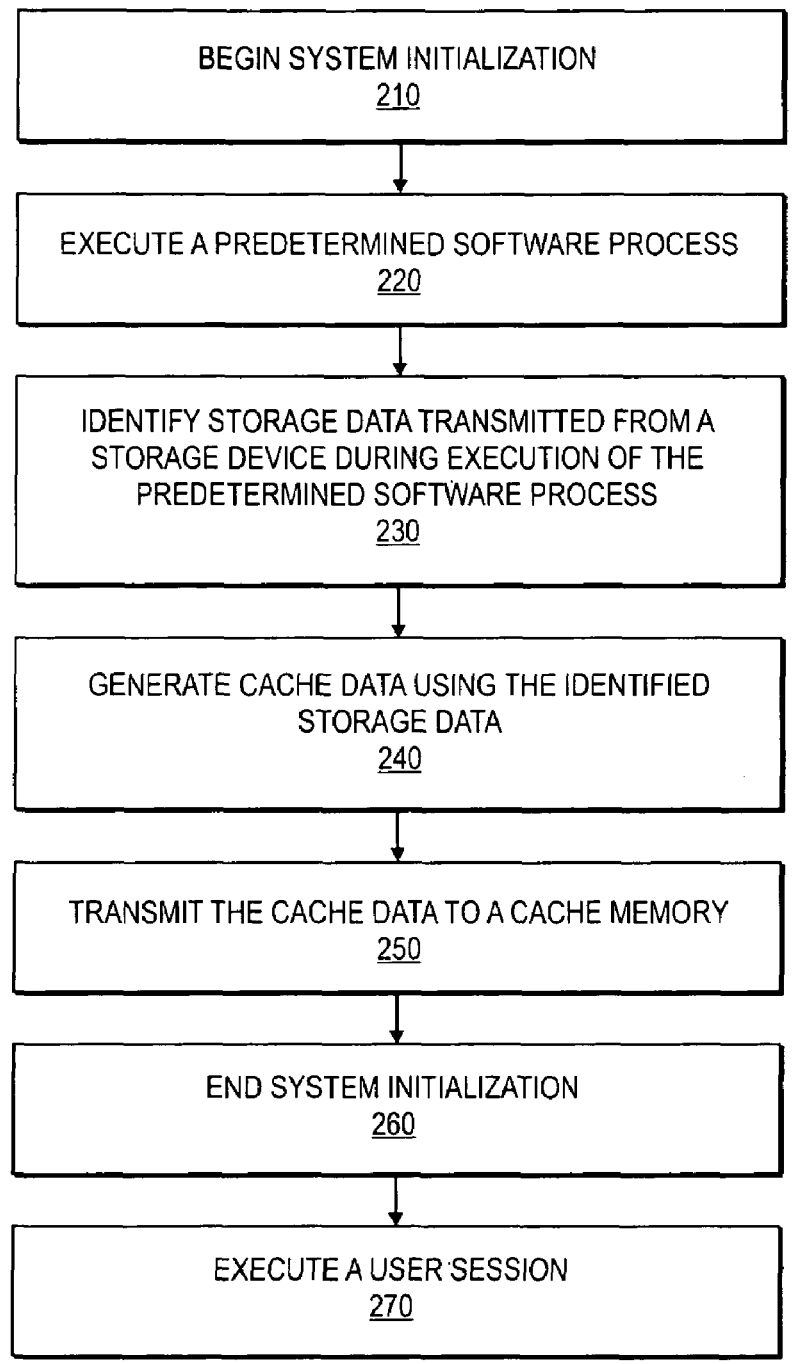
FIG. 2 is a flow chart illustrating a method to generate cache data in accordance with an embodiment of the claimed subject matter.

Turning to FIG. 2, a method 200 to generate cache data in accordance with an embodiment of the claimed subject matter is described. This method may be illustrated with reference to computing system 100 (FIG. 1). In some embodiments, processor 120 and/or memory controller 140 may include circuitry, software, or a combination of circuitry and software to implement the method described in FIG. 2. The method illustrated in FIG. 2 may be used to preload (e.g., prior to a user session) a memory (e.g., cache memory 160) by determining or identifying which information to store or place in the memory. The information placed in the memory may be used for caching.

This embodiment may begin with system initialization (block 210). System initialization of computing system 100 may occur both when the power is first turned on and/or any initialization of the components of computing system 100 prior to a user session.

Computing system 100 may be adapted to support many different types of software processes or programs, e.g., a graphic image viewer, a graphic image editor, a word processor, a spreadsheet program, email, an internet browser, publishing software, etc. During the system initialization, a predetermined software process (e.g., a word processor) may be selected and executed by processor 120 (block 220). By selecting a particular, known software application, cache memory 160 may be systematically loaded with cache data that likely may be accessed during subsequent execution of the software application.

Access to storage device 170 may be monitored to identify the storage data transmitted from storage device 170 during execution of the predetermined software process (block 230). The storage data accessed during execution of a software process may also be referred to as access data. The identified storage data, i.e., the data identified in block 230, may be data that is accessed by the predetermined software process and/or an operating system during execution of the predetermined software process. In some embodiments, the identified storage data may be data files or executable files that may include instructions.

The storage data identified by the monitoring may be used to generate cache data (block 240) that may be used to populate cache memory 160. The identified storage data may be transmitted from storage device 170 to cache memory 160 (block 250). In this embodiment, by transferring the identified storage data to cache memory 160, the identified storage data serves as cache data for a predetermined software process and may be accessed from cache memory 160 rather than from storage device 170 during subsequent execution of the predetermined software process. In alternate embodiments, a portion of the identified storage data may be transmitted to cache memory 160 to serve as the cache data. In some embodiments, the identified storage data may be generated prior to initialization of cache memory 160.

In some embodiments, the identified storage data may be analyzed to determine how much, if any, of the identified storage data may be placed in cache memory 160. For example, a targeted level of performance for computing system 100 may be desired, and a portion of the identified storage data may be placed in cache memory 160 to achieve this targeted level of performance. In another example, it may be determined that none of the identified storage data is to be placed in cache memory 160 to achieve a targeted level of performance.

In this embodiment, after the storage data is identified and is transferred to cache memory 160, cache memory 160 is populated with cache data generated using the identified storage data. The system initialization may then be completed (block 260) and may be followed by execution of a user session (block 270). During operation of computing system 100 by a user, if the user executes the predetermined software application, the user may observe an increased level of performance compared to operating computing system 100 without a populated cache memory.

Although the term data is used throughout the description of the various embodiments, it should be noted that the scope of the claimed subject matter is not limited to noninstruction data. The term data may refer to various type of computing information such as, for example, instructions, noninstruction data, files, or software code.

Figure 3:
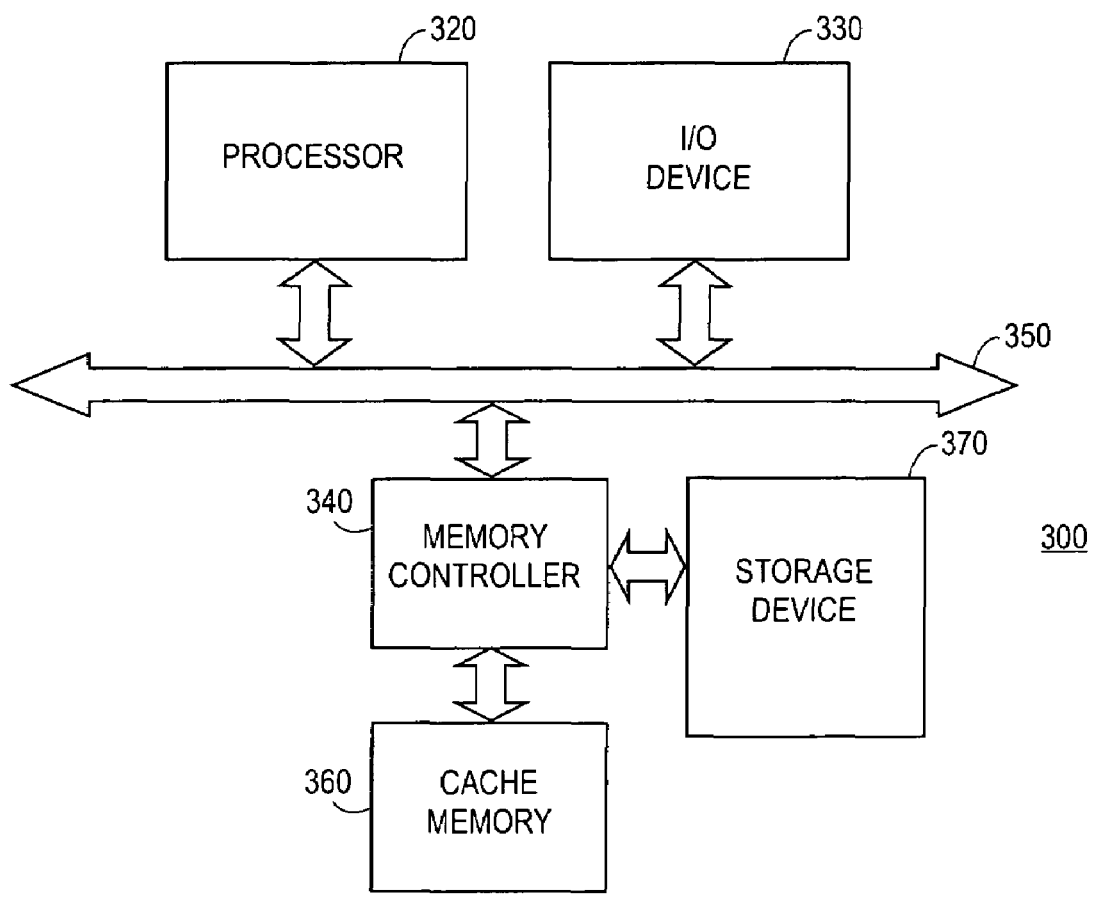
FIG. 3 is a block diagram illustrating a computing system in accordance with an embodiment of the claimed subject matter.

Performance improvements may be realized in other systems by transferring the identified storage data and/or any associated access information to other systems. For example, FIG. 3 illustrates an embodiment of another computing system 300 that has a similar configuration as computing system 100 of FIG. 1. Computing system 300 may be manufactured to include a copy of the identified storage data in storage device 370. The copy of the identified storage data may be located at a different physical location in storage device 370 than the physical location of the identified storage data in storage device 170.

Referring again to block 230 of FIG. 2, in alternate embodiments, access information that includes the names of the files accessed and the physical location of the files accessed during execution of the predetermined process may be generated after performing the monitoring of access to storage device 170. A logical representation of the physical location of the files accessed may be generated so that the access information may be interpreted by another system (e.g., computing system 300) having a copy of the identified storage data.

As an example, the physical location of the identified storage data in storage device 170 may be converted to a logical address. The logical address may also be referred to as a virtual address. After the physical-to-logical conversion, the access information may be transmitted from computing system 100 to computing system 300. Computing system 300 may process the access information to populate cache 360 with cache data that may be relevant to the execution of the predetermined process by processor 320. For example, computing system 300 may convert the logical address included in the access information to a physical address of the copy of the identified storage data located in storage device 370. After determining the location of the copy of the identified storage data, this copy may be transmitted from storage device 370 to cache memory 360 to serve as cache data. Therefore, the performance of computing system 300 may be increased since data accessed by a predetermined software process may be accessed from cache memory 360 rather than from storage device 370 during subsequent execution of the predetermined software process by computing system 300.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method comprising:
   identifying in a first system data transmitted from a first medium during execution of a predetermined software process; and
   generating access information based on the identifying to generate cache data in a second system having a copy of identified data in a second medium.

2. The method of claim 1, wherein the generating access information comprises determining a physical location of identified data in the first medium and converting the physical location to a logical address.

3. The method of claim 1, comprising:
   processing generated access information in the second system;
   generating cache data using data from the second medium based on processed access information; and
   storing generated cache data in a nonvolatile cache in the second system.

4. The method of claim 3, wherein the storing occurs prior to any user session in the second system.

5. The method of claim 3, wherein the generating access information comprises determining a physical location of identified data in the first medium and converting the physical location to a logical address; and
   wherein the processing generated access information comprises converting the logical address to a physical location of a copy of identified data in the second medium.

6. The method of claim 3, wherein the storing comprises storing generated cache data in a polymer ferroelectric memory.

7. The method of claim 3, wherein the storing comprises storing generated cache data in a nonvolatile disk cache memory.

8. A method comprising:
   processing in a first system access information generated from a second system;
   generating cache data using data from a medium in the first system based on processed access information; and
   storing generated cache data in a nonvolatile cache in the first system.

9. The method of claim 8, wherein the storing occurs prior to any user session in the first system.

10. The method of claim 8, wherein the processing access information comprises converting a logical address in the access information to a physical location of data in a medium.

11. The method of claim 8, wherein the storing comprises storing generated cache data in a polymer ferroelectric memory.

12. The method of claim 8, wherein the storing comprises storing generated cache data in a nonvolatile disk cache memory.

13. A tangible medium having instructions that, when executed in a first system, result in:
   identifying data transmitted from a first medium during execution of a predetermined software process; and
   generating access information based on the identifying to generate cache data in a second system having a copy of identified data in a second medium.

14. The tangible medium of claim 13, wherein the instructions, when executed in the first system, result in determining a physical location of identified data in the first medium and converting the physical location to a logical address.

15. A tangible medium having instructions that, when executed in a first system, result in:
   processing access information generated from a second system;
   generating cache data using data from a medium in the first system based on processed access information; and
   storing generated cache data in a nonvolatile cache in the first system.

16. The tangible medium of claim 15, wherein the instructions, when executed in the first system, result in the storing occurring prior to any user session in the first system.

17. The tangible medium of claim 15, wherein the instructions, when executed in the first system, result in converting a logical address in the access information to a physical location of data in a medium.

18. A system comprising:
   a storage device to store a copy of data stored in another system;
   circuitry to process access information generated from the other system and to generate cache data using data from the storage device based on processed access information; and
   a nonvolatile cache memory to store generated cache data.

19. The system of claim 18, wherein the circuitry is to convert a logical address in the access information to a physical location of data in the storage device.

20. The system of claim 18, wherein access time of the nonvolatile cache memory is less than access time of the storage device.

21. The system of claim 18, wherein the storage device is integrated with the nonvolatile cache memory.

22. The system of claim 18, wherein the storage device comprises nonvolatile disk memory.

23. The system of claim 18, wherein the nonvolatile cache memory comprises a polymer ferroelectric memory.

24. The system of claim 18, wherein the nonvolatile cache memory comprises a nonvolatile disk cache memory.

* * * * *